United States Patent
Rottner et al.

[15] 3,678,146
[45] July 18, 1972

[54] PROCESS FOR MAKING PIPE BENDS OF THERMOPLASTIC MATERIAL

[72] Inventors: Emil Rottner; Franz Bock; Willi Muth; Gunter Wenzel, all of c/o Farbwerke Hoechst AG, Frankfurt am Main, Germany

[22] Filed: April 30, 1970

[21] Appl. No.: 43,633

Related U.S. Application Data

[62] Division of Ser. No. 775,443, Nov. 13, 1968, Pat. No. 3,562,860.

[30] Foreign Application Priority Data

Nov. 29, 1967 Germany..................P 17 04 661.6

[52] U.S. Cl..............................264/313, 264/295, 264/339
[51] Int. Cl.........................................B29c 1/12, B29d 23/10
[58] Field of Search................18/19 TM; 264/295, 310, 312, 264/313, 315, 318, 323, 339

[56] References Cited

UNITED STATES PATENTS

| | | | |
|---|---|---|---|
| 3,425,092 | 2/1969 | Taga | 264/323 X |
| 2,964,796 | 12/1960 | Press | 264/339 X |
| 1,877,628 | 9/1932 | Replogle | 264/339 X |
| 2,389,038 | 11/1945 | German | 264/339 X |

Primary Examiner—Robert F. White
Assistant Examiner—Richard R. Kucia
Attorney—Curtis, Morris & Safford

[57] ABSTRACT

Pipe bends of thermoplastic material are manufactured by thermoforming by shoving a sleeve-shaped pipe section which is closed at one end into a pipe bend mold which is symmetrically split in the longitudinal direction. The introduction is carried out with the help of a flexible core which is several times split longitudinally and which is pressed against the bottom of the pipe section. After cooling, the mold is opened and the core or its individual parts are pulled out of the pipe bend and the ends of the latter are trimmed.

2 Claims, No Drawings

PROCESS FOR MAKING PIPE BENDS OF THERMOPLASTIC MATERIAL

This application is a divisional of application Ser. No. 775,443 filed Nov. 13, 1968, now U.S. Pat. No. 3,562,860.

By optimum thermoforming temperature there is meant the temperature range in which the plastic material yields to the shaping forces, but still possesses sufficient cohesion to withstand rupture under these forces. This temperature range which is generally desired in thermoforming processes is little pronounced in some thermoplastic materials. In some thermoplastics rubber-elastic behavior or plastic flow sets in at temperatures above the second order transition temperature; these materials cannot therefore be used for the thermoforming processes in question.

It has already been proposed to manufacture pipe bends from plates. The plates are made into semi-cups which are then welded to one another. The weld is often disturbing. This process is moreover rather complicated and correspondingly time-consuming.

Other processes which have generally been known from metal working yield wrinkled pipe bends when applied to thermoplastic materials or can be used only for a determined range of size. Examples of such processes are hot-bending after filling the pipe with sand and cold-bending.

It has also been proposed to make pipe bends by pressing heated pipes of thermoplastic material into a mold over a mandrel detachably connected with a rigid core which is adjusted to the shape of the pipe bend. In this process, however, compressions of the material occur which render the execution of the process difficult and, in the case of some thermoplastics, lead to a high proportion of rejects.

Now we have found that the above disadvantages of the known processes for the manufacture of pipe bends of thermoplastic materials can be avoided by heating a sleeve-shaped pipe section which is closed at one end up to the range of the optimum thermoforming temperature, chilling the sleeve bottom, shoving the pipe section with the bottom ahead into the mold with the help of a flexible core which is several times split longitudinally and which is pressed against the bottom, and withdrawing the individual parts of the core after cooling the pipe bend.

When the pipe section is introduced into the mold the individual parts of the core are displaced with respect to one another and the bottom of the pipe is slanted. This enables tearing and compressing of the material which generally occurs in the bending of pipes to be substantially prevented. The wall of the mold and the core remain in contact with the pipe material throughout bending and the motion of the pipe material with respect to the core is only small as is the pressure which is exerted on the wall of the mold. With the friction being considerably reduced as compared with the compression molding technique, the mold fulfils the function of guiding.

The process in accordance with the invention is not limited to determined nominal sizes of pipe, but is applicable to any extrudable pipe. It can be used with particular advantage for the shaping of pipes of large widths in the case of which the known shaping processes cannot be used or would be too complicated.

For making pipe bends, preferably short bends, it is advantageous to start from sleeves obtained by deep drawing. In special cases the pipe section to be shaped may advantageously be closed at one end by welding a bottom of it.

The process of the invention is preferably carried out using a device comprising a mold which is symmetrically split in the longitudinal direction and a core which can be pulled out, wherein the core consists of laminae which can be displaced with respect to one another and is combined with a hemispherical pressure member lying loosely on the core and with a guide pipe which encloses the pressure member and part of the core and can be shifted in the mold.

Cores composed of laminae of, for example, polyethylene, readily follow the curvature of the pipe bend; the laminae can easily be displaced with respect to one another. The guide pipe which is also made of thermoplastic material, for example polyethylene, prevents the laminae from being pressed asunder and from jamming; it simultaneously serves to guide the pressure member.

As laminae it is also possible to use thin metal strips or alternate strips of metal and of plastic material. The strips may be 0.5 mm to 8 mm thick. For smaller nominal sizes and smaller radii of curvature it is advantageous to use the thinner laminae.

When it is intended to make pipe bends of small radii of curvature, cores consisting of individual rods, for example, round rods, may advantageously be used.

Instead of a hemispherical or cup-shaped pressure member, it is also possible to use a plate fixed to a plunger so as to be articulated.

The mold may be of wood, plastics, or metal. Molds provided with heating and cooling means, for example, channels for the passage of a heat exchanging medium, are particularly suitable. The entire heat treatment, particularly heating, cooling and optionally tempering, may then be carried out in the mold. The chilling of the sleeve bottom may in this case be easily performed by blowing, for example, with air or by spraying, for example, with water. The core may be withdrawn after removal of the pipe bend from the mold. For this purpose it is advantageous to use a support for the bend and a pair of tongs for removing the core.

A device suitable for use in carrying out the process of the invention is illustrated diagrammatically by way of example in the accompanying drawing of which:

FIG. 1 is a longitudinal section showing the position of the individual parts at the beginning of the shaping process;

FIG. 2 is a longitudinal section showing the position of the individual parts at the end of the shaping process;

FIG. 3 is a cross-section on line I–II of FIG. 1.

In FIGS. 1 and 2, the half 1 of the pipe bend mold has not been shown in order to more clearly demonstrate the invention. The other half 2 is symmetric to half 1. The core is formed by laminae 3. The base of pressure member 4, which is a hemisphere made of plastic, rests loosely on the core. The guide pipe 5 surrounds the hemisphere and the upper part of the core. The sleeve to be produced is denoted by 7. FIG. 3 which is a cross-section of the mold and the core shows the position of the cooling and heating channels 6.

The following Example serves to illustrate the invention, but is not intended to limit it.

EXAMPLE

To make a 90° bend from a polyethylene pipe having an outside diameter of 220 mm and an inside diameter of 200 mm, a plane bottom was first welded to the pipe. For this purpose the bottom was heated to welding temperature in a heating furnace and one end of the pipe was heated, also to welding temperature, on a so-called "welding mirror," and pipe and bottom were then united by pressing one against the other.

The sleeve 7 so obtained was heated to a temperature of 150° to 152°C. The bottom was then chilled by immersion in cold water. A core consisting of laminae of polyethylene 3 2 mm thick, was introduced into the pipe and the latter was drawn into the mold 2 with the help of the core. After cooling, the resulting pipe bend was removed from the mold together with the core and put in a clamping device and the core was withdrawn in small packs. Finally, the ends of the pipe bend were trimmed.

In the same manner, pipe bends can be made from other thermoplastics. For each thermoplastic material the appropriate forming temperature must be observed. The approximate appropriate forming temperature may be determined according to the data given in plastics vade-mecum and trade catalogs. For rigid polyvinyl chloride this temperature is, for example, by about 50°C lower, and for polypropylene, for example, by about 20°C higher than the temperature given above for rigid low pressure polyethylene. The forming temperatures may vary with the modification used in a given case. The same considerations apply for the welding process for making the sleeve.

What is claimed is:

1. A process for the manufacture of pipe bends of thermoplastic material which comprises heating, to the range of the optimum thermoforming temperature, a sleeve-shaped pipe section which is closed at one end, chilling the closed end, shoving the pipe section, with the closed end leading, into a pipe bend mold with the help of a flexible core which is split longitudinally several times and pressed against said closed end, and withdrawing the individual parts of the core after cooling the bent pipe.

2. The process of claim 1 wherein a sleeve obtained by deep drawing is used.

* * * * *

UNITED STATES PATENT OFFICE
CERTIFICATE OF CORRECTION

Patent No. 3,678,146         Dated July 18, 1972

Inventor(s) Emil Rottner, Franz Bock, Willi Muth and Gunter Wenzel

It is certified that error appears in the above-identified patent and that said Letters Patent are hereby corrected as shown below:

In the Heading:

After the identification of the inventors, insert --Assignee:  Farbwerke Hoechst Aktiengesellschaft vormals Meister, Lucius & Bruning Frankfurt am Main, Germany--.

Signed and sealed this 13th day of March 1973.

(SEAL)
Attest:

EDWARD M. FLETCHER, JR.              ROBERT GOTTSCHALK
Attesting Officer                     Commissioner of Patents FORM PO-1050 (10-69)                                    USCOMM-DC 60376-P69
                                               ☆ U.S GOVERNMENT PRINTING OFFICE : 1969 O—366-334